(12) United States Patent
Dorbie et al.

(10) Patent No.: US 7,944,442 B2
(45) Date of Patent: *May 17, 2011

(54) GRAPHICS SYSTEM EMPLOYING SHAPE BUFFER

(75) Inventors: Angus M. Dorbie, San Diego, CA (US);
Alexei V. Bourd, San Diego, CA (US);
Chun Yu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 598 days.

This patent is subject to a terminal disclaimer.

(21) Appl. No.: 11/609,762

(22) Filed: Dec. 12, 2006

(65) Prior Publication Data

US 2008/0122866 A1 May 29, 2008

Related U.S. Application Data

(60) Provisional application No. 60/826,908, filed on Sep. 26, 2006.

(51) Int. Cl.
*G06T 15/40* (2006.01)
(52) U.S. Cl. ........ 345/421; 345/611; 345/613; 345/614; 345/622; 345/626
(58) Field of Classification Search .................. 345/611, 345/626
See application file for complete search history.

(56) References Cited

U.S. PATENT DOCUMENTS

| | | | |
|---|---|---|---|
| 5,321,770 A | 6/1994 | Huttenlocher et al. | |
| 5,613,052 A | 3/1997 | Narayanaswami | |
| 6,292,194 B1 * | 9/2001 | Powell, III | 345/582 |
| 6,404,936 B1 | 6/2002 | Katayama et al. | |
| 6,633,297 B2 | 10/2003 | McCormack et al. | |
| 6,731,300 B2 | 5/2004 | Ramani et al. | |
| 6,765,576 B2 * | 7/2004 | Nelson | 345/441 |
| 6,768,491 B2 | 7/2004 | Lefebvre et al. | |
| 6,819,332 B2 | 11/2004 | Baldwin | |

(Continued)

OTHER PUBLICATIONS

Ackermann, "Single Chip Hardware Support for Rasterization and Texture Mapping," Computers and Graphics, Jul. 1996, pp. 503-514, vol. 20, No. 4, Elsevier, GB, XP004025144.

(Continued)

*Primary Examiner* — Daniel Washburn
*Assistant Examiner* — Robert Bader

(57) ABSTRACT

The system includes a shape buffer manager configured to store coverage data in the shape buffer. The coverage data indicates whether each mask pixel is a covered pixel or an uncovered pixel. A mask pixel is a covered pixel when a shape to be rendered on a screen covers the mask pixel such that one or more coverage criteria is satisfied and is an uncovered pixel when the shape does not cover the mask pixel such that the one or more coverage criteria are satisfied. A bounds primitive rasterizer is configured to rasterize a bounds primitive that bounds the shape. The bounds primitive is rasterized into primitive pixels that each corresponds to one of the mask pixels. A pixel screener is configured to employ the coverage data from the shape buffer to screen the primitive pixels into retained pixels and discarded pixels. The retained pixels each corresponds to a mask pixel that the coverage data indicates is a covered pixel and the discarded pixels each correspond to a mask pixels that the coverage data indicates is an uncovered pixel. The system also includes an attribute generator configured to generate pixel attributes for the retained primitive pixels and also configured not to generate pixel attributes for the discarded primitive pixels.

23 Claims, 7 Drawing Sheets

U.S. PATENT DOCUMENTS

| | | | |
|---|---|---|---|
| 7,006,110 | B2 | 2/2006 | Crisu et al. |
| 7,280,119 | B2 | 10/2007 | Leather et al. |
| 7,456,846 | B1 | 11/2008 | King et al. |
| 7,652,677 | B2 | 1/2010 | Dorbie et al. |
| 2002/0097241 | A1 | 7/2002 | McCormack et al. |
| 2002/0130886 | A1* | 9/2002 | Baldwin .................. 345/611 |
| 2004/0207642 | A1 | 10/2004 | Crisu et al. |
| 2008/0030522 | A1 | 2/2008 | Dorbie et al. |

OTHER PUBLICATIONS

International Search Report, PCT/US07/079591, International Search Authority, European Patent Office, May 7, 2008.

Written Opinion, PCT/US07/079591, International Search Authority, European Patent Office, May 7, 2008.

International Search Report, PCT/US07/075135, International Search Authority, European Patent Office, Nov. 18, 2008.

Written Opinion, PCT/US07/075135, International Search Authority, European Patent Office, Nov. 18, 2008.

Capens, "Advanced Rasterization," DEVMASTER.NET Forum Post, Nov. 9, 2004, Internet Refernce, XP002503146.

Green, "Hierchical Polygon Tiling with Coverage Masks," Association for Computing Machinery, Computer Graphics Proceedings 1996 (SIGGRAPH), New Orleans, Aug. 4, 1996, pp. 65-74, SIGGRAPH, New York, NY, USA, XP000682722.

Rueda et al., "Rasterizing complex polygons without tessellations," Graphical Models, May 1, 2004, pp. 127-132, vol. 66, No. 3, Elsevier, San Diego, CA, USA, XP001244485.

International Preliminary Report on Patentability—PCT/US07/079591—International Preliminary Authority—European Patent Office—Dec. 23, 2008.

Office Action from U.S. Appl. No. 11/499,200, dated Feb. 17, 2009, 11 pp.

Response to Office Action dated Feb. 17, 2009, from U.S. Appl. No. 11/499,200, filed Jun. 17, 1009, 11 pp.

Notice of Allowance for U.S. Appl. No. 11/499,200, mailed Sep. 18, 2009, 4 pp.

Amendment for U.S. Appl. No. 11/499,200, filed Sep. 7, 2010, 3 pp.

* cited by examiner

A B

C D

E F G

GRAPHICS SYSTEM EMPLOYING SHAPE BUFFER

CLAIM OF PRIORITY UNDER 35 U.S.C. §119

The present Application for Patent claims the benefit of U.S. Provisional Patent Application Ser. No. 60/826,908 filed on Sep. 26, 2006, entitled GRAPHICS SYSTEM EMPLOYING SHAPE BUFFER, and incorporated herein in its entirety.

BACKGROUND

1. Field

The present invention relates generally to graphics systems for rendering images and more particularly to graphics rasterization methods.

2. Background

Graphics systems often rasterize different shapes into pixels. During rasterization, the graphics system identify which pixels fall within the shape. The process of identifying the pixels that fall within the shape becomes more difficult as the shape becomes more complex. Features that can contribute to the complexity of a shape include smooth curves, concave geometry, self-intersection, holes, and aggregation of multiple shapes. Graphics systems can deal with these complex shapes by converting the shape into multiple simpler shapes or by directly rasterizing the complex shapes. These solutions are inefficient and can be difficult to implement in hardware. For these reasons, there is a need for an improved graphics system.

SUMMARY

A graphics system is configured to retain a primitive pixel in a rasterized bounds primitive when coverage data stored in a shape buffer indicates that a mask pixel corresponding to the primitive pixel is a covered pixel and to discard the primitive pixel when the coverage data indicates that the mask pixel corresponding to the primitive pixel is an uncovered pixel. The corresponding mask pixel is a covered pixel when a shape bounded by the bounds primitive covers the mask pixel such that one or more coverage criteria is satisfied and is an uncovered pixel when the shape does not cover the mask pixel such that the one or more coverage criteria are satisfied.

An embodiment of the system includes a shape buffer manager configured to store coverage data in a shape buffer. The coverage data indicates whether mask pixels are each a covered pixel or an uncovered pixel. A mask pixel is a covered pixel when a shape to be rendered on a screen covers the mask pixel such that one or more coverage criteria is satisfied and is an uncovered pixel when the shape does not cover the mask pixel such that the one or more coverage criteria are satisfied. A bounds primitive rasterizer is configured to rasterize a bounds primitive that bounds the shape. The bounds primitive is rasterized into primitive pixels that each corresponds to one of the mask pixels. A pixel screener is configured to employ the coverage data from the shape buffer to screen the primitive pixels into retained pixels and discarded pixels. The retained pixels each correspond to a mask pixel that is a covered pixel and the discarded pixels each correspond to a mask pixels that is an uncovered pixel. The system also includes an attribute generator configured to generate pixel attributes for the retained primitive pixels and also configured not to generate pixel attributes for the discarded primitive pixels.

BRIEF DESCRIPTION OF THE DRAWINGS

FIG. 3 also illustrates application of the oddeven rule to the primitives so as to determine whether a pixel region is a covered region or an uncovered region.

FIG. 4 also illustrates application of the non-zero rule to the primitives so as to determine whether a pixel region is a covered region or an uncovered region.

DETAILED DESCRIPTION

A graphics system decomposes a screen shape into a plurality of primitives. The primitives are rasterized into mask pixels that each correspond to a pixel on the screen. In some instances, each pixel on the screen corresponds to a mask pixel. The system generates coverage data for the mask pixels. The coverage data indicates whether each mask pixel is a covered pixel or an uncovered pixel. A mask pixel is a covered pixel when the shape covers the mask pixel such that one or more coverage criteria is satisfied and is an uncovered pixel when the shape does not cover the mask pixel such that the one or more coverage criteria are satisfied. The coverage data is stored in a shape buffer.

The system also includes a bounds primitive rasterizer configured to rasterize a bounds primitive that bounds the screen shape. The bounds primitive is rasterized into primitive pixels that each corresponds to one of the mask pixels. A pixel screener employs the coverage data from the shape buffer to screen the primitive pixels into retained pixels and discarded pixels. Each of the retained pixels corresponds to a mask pixel that is a covered pixel and each of the discarded pixels corresponds to a mask pixels that is an uncovered pixel. An attribute generator generates pixel attributes for the retained primitive pixels but does not generate pixel attributes for the discarded primitive pixels.

The system can clear portions of the shape buffer after accessing coverage data for one or more first mask pixels and before accessing coverage data for one or more second mask pixels. Clearing the shape buffer permits additional data to be stored in the shape buffer. For instance, the system can store coverage data for the next shape in the shape buffer while the system is still accessing coverage data from the first shape. As a result, the shape buffer can enhance the efficiency of the graphics system by permitting the graphics system to concurrently process shapes. Since these shapes can be generated from multiple primitives, the shapes can be complex shapes. As a result, the shape buffer can provide efficient rendering of complex shapes.

In some instances, the coverage data includes fractional coverage data that indicates the fraction of each mask pixel that is covered by the shape. The fractional coverage data can be used in anti-aliasing techniques such as Porter Duff blending. Using the coverage data both in screening the primitive pixels and also in anti-aliasing can further increase the efficiency of the graphics system.

Figure 1:
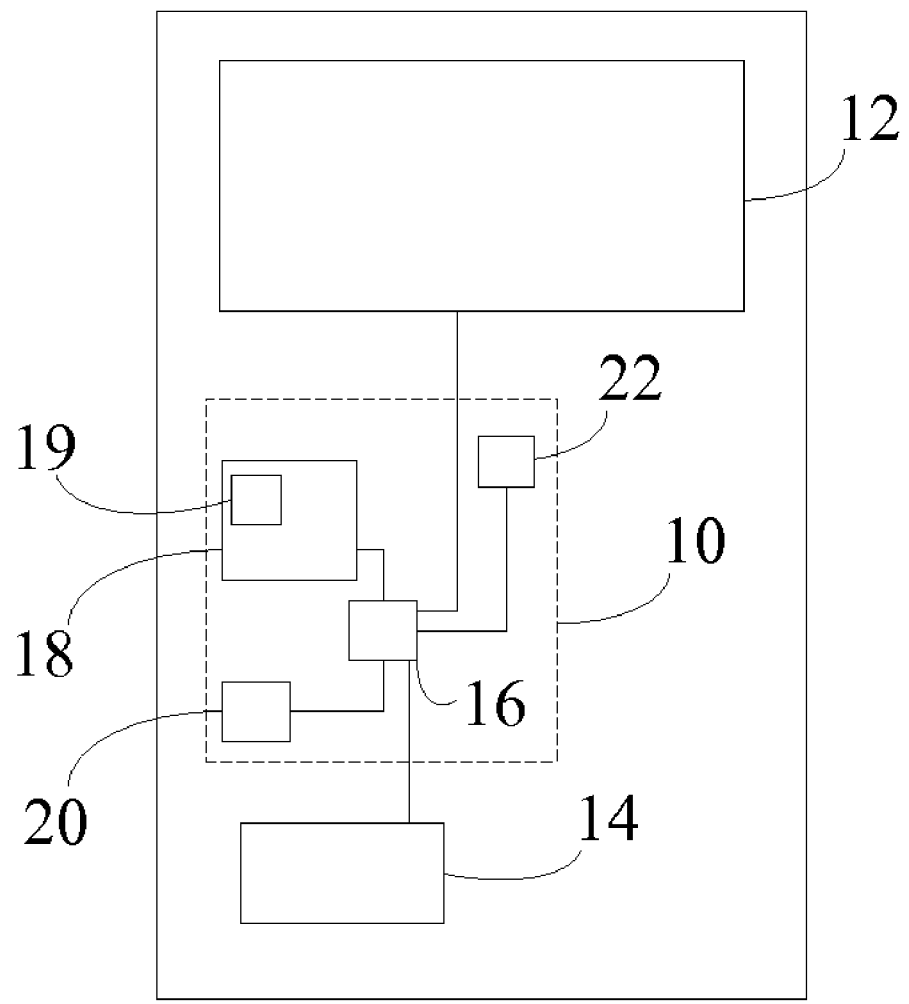
FIG. 1 is a box diagram of a graphics system.

FIG. 1 illustrates a graphics system that includes electronics 10 in communication with a display screen 12. The electronics 10 are configured to render an image on the display 12.

Suitable displays 12 include, but are not limited to, liquid crystal displays (LCDs), and cathode ray tube (CRT) displays.

The electronics 10 are also in communication with one or more user interfaces 14. Suitable user interfaces 14 include, but are not limited to, buttons, knobs, keys, keypads, keyboards, and a mouse. A user of the graphic system can employ the one or more user interfaces to provide commands to the electronics 10. The electronics 10 can execute the commands and display the results of the command on the display 12. Examples of commands include a change in the viewpoint from which the image is viewed. Accordingly, the electronics 10 can change the image on the display as required by the change in viewpoint. In executing commands, the electronics 10 can operate the system completely or partially in accordance with an Application Programming Interface (API) such as OpenVG on a software interface such as Open Graphics Library (OpenGL), OpenGLES, and Direct3D, etc. OpenVG is a standard of 2D vector graphics in handheld/mobile devices and is described in a document entitled "The OpenVG Specification," Version 1.0, dated Jul. 28, 2005. OpenGL is described in a document entitled "The OpenGL® Graphics System: A Specification," Version 2.0, dated Oct. 22, 2004.

The electronics 10 include a controller 16. A suitable controller 16 includes, but is not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions attributed to the electronics 10 and/or the controller 16. A general purpose processor may be a microprocessor, but in the alternative, the controller 16 may include or consist of any conventional processor, microcontroller, or state machine. A controller 16 may also be implemented as a combination of computing devices, e.g., a combination of a DSP and a microprocessor, a plurality of microprocessors, one or more microprocessors in conjunction with a DSP core, or any other such configuration.

The electronics 10 include a memory 18 in communication with the controller 16. The electronics 10 can store data for the image and data for rendering the image in the memory 18. The memory 18 can be any memory device or combination of memory devices suitable for read/write operations.

The electronics 10 include a shape buffer 19 in communication with the controller 16. As will be described in more detail below, the electronics can store coverage data generated from a pixel mask in the shape buffer 19. The shape buffer can be employed only to store data from the pixel mask. Alternately, the shape buffer can be used for other applications. For instance, graphics systems that employ OpenGL use stencil testing and z-testing. The stencil testing employs a stencil buffer and the z-testing employs a z-buffer or a modified z-buffer. A z-buffer, a modified z-buffer, and/or the stencil buffer can serve as the shape buffer. Although the shape buffer is shown as being included in the memory, the buffer can be separate from the memory.

In some instances, the electronics 10 include a computer-readable medium 20 in communication with the controller 16. The computer-readable medium 20 can have a set of instructions to be executed by the controller 16. The controller 16 can read and execute instructions included on the computer-readable medium. The controller executes the instructions such that the electronics 10 perform desired functions such as executing a command provided by the user. Although the computer-readable medium 20 is shown as being different from the memory 18, the computer-readable medium 20 can be the same as the memory 18. Suitable computer-readable media include, but are not limited to, optical discs such as CDs, magnetic storage diskettes, Zip disks, magnetic tapes, RAMs, and ROMs.

As will be described in more detail below, some functions of the electronics may be executed using hardware as opposed to executing these functions in firmware and/or software. When electronics implement a function using firmware and/or software, the electronics employ a processor to execute instructions on a computer-readable medium. For instance, the electronics can employ a processor reading software written on a RAM implement a function. In contrast, when the electronics implement a function in hardware, the hardware does not execute instructions on the computer-readable medium.

In some instances, the graphics system is configured to communicate wirelessly with a network. Accordingly, the controller 16 can optional be in communication with a transceiver 22. The controller 16 can employ the transceiver to send and/or receive messages to a network. As an alternative to the transceiver, the electronics 10 can be in communication with a receiver and a transmitter. When the graphics system is configured to communicate wirelessly with a network, the electronics 10 can operate in accordance with a wireless communications standard such as Code Division Multiple Access (CDMA), Time Division Multiple Access, such as Global System for Mobile Communications (GSM), or some other wireless communication standard.

Suitable graphic systems include, but are not limited to, cellular phones, access terminals, handsets, personal digital assistants (PDA), laptop computers, video game units, and personal computers. Although FIG. 1 illustrates the electronics 10, the display 12, and the one or more user interfaces integrated into a single device in a case, the electronics 10, the display 12, and/or the one or more user interfaces can be included in different devices and/or can be located remotely from one another. Additionally or alternately, different components of the electronics 10 can be included in different devices.

Figure 2:
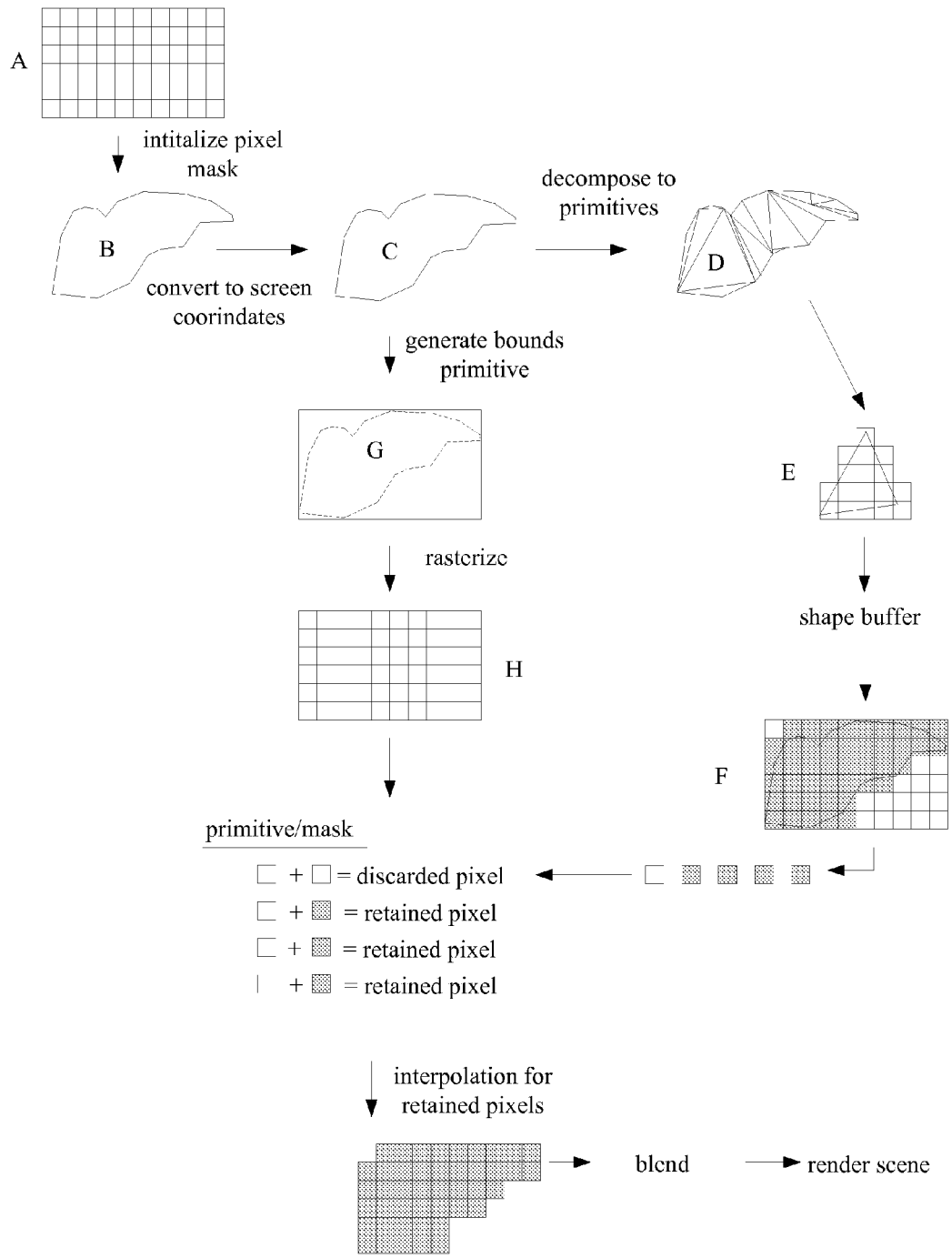
FIG. 2 illustrates progression of data through a graphic system.

FIG. 2 illustrates progression of data through the graphics system. The electronics make use of a pixel mask. The pixel mask is divided into a plurality of mask pixels that are each divided into one or more pixel regions. The electronics generate coverage data that indicates whether each pixel region is a covered region or an uncovered region. The coverage data can be stored in memory such as a shape buffer. The electronics can initialize the pixel mask by designating each of the pixel regions as an uncovered pixel. Diagram A illustrates a pixel mask where each of the mask pixels is identified as an uncovered pixel.

The electronics receive a shape description for a shape to be displayed on the display screen. Diagram B illustrates the described shape. The shape description can be in two or more dimensions. For instance, the shape description can be three-dimensional. Suitable shape descriptions can include one or more mathematical equations. For instance, the mathematical equation for a circle or a sphere are well-known. The complexity of the shape can be increased by adding mathematical equations, subtracting mathematical equations, and/or performing other operations on mathematical equations. The shape description can be made using methods other than or in addition to mathematical equations. Accordingly, the shape description can exclude mathematical equations.

In some instances, the graphics system converts the shape description to screen coordinates. Accordingly, diagram C in FIG. 2 illustrates the screen shape in screen coordinates. The transformation to screen coordinates can include one or more transformations. For instance, when the shape description is in three dimensions, the graphics system can transform the object shape description to world coordinates, from the world coordinates to eye coordinates, from eye coordinates to homogeneous perspective eye coordinates, from this representation through homogeneous divide to screen coordinates, and finally from the screen coordinates a viewport transformation maps these coordinates to device specific coordinates which are directly mapped to some in-memory layout. The transformation from the shape description to the world coordinates can effectively place all shapes in a common world. The eye coordinates are the coordinates of the 3D objects relative to a computed viewpoint. Typically, the transformation of the shape to world coordinates and then to eye coordinates is performed as a single transformation that can be done through a single modelview matrix transformation. The transformation from the eye coordinate system to the homogeneous eye coordinate system causes objects that are further from the viewpoint to appear smaller than closer objects after the homogeneous divide. The transformation from eye coordinates to screen coordinates can generally be done through a projection matrix and the homogeneous divide can be implicit and can be designed into the hardware. The screen coordinate system is nominally a 2D system after a homogeneous normalization is performed although some 3D information may be retained for hidden surface and perspective correct interpolation calculations. The device coordinates represent a direct mapping of the image that is to be rendered on the screen. In some instance, the device coordinates can serve as the screen coordinates and/or the screen coordinates serve as the device coordinates. When the shape description is in two-dimensions, one or more of the above transformations may not be required. For instance, the transformation into eye coordinates and perspective eye coordinates may not be required when the shape description is two-dimensional.

The electronics decompose the screen shape to one or more primitives. For instance, diagram D illustrates the screen shape of diagram C decomposed into a plurality of primitives. Primitives are employed to approximate different surfaces, points, or edges in an image. The primitives can include, points, lines and/or polygons such as triangles.

The electronics rasterize the primitives into mask pixels such that each mask pixel is divided into one or more pixel regions. When each mask pixel includes a plurality of pixel regions, the electronics rasterize the primitives into the pixel regions. Each mask pixel corresponds to a pixel on the screen. For the purposes of illustration, diagram E in FIG. 2 illustrates a primitive rasterized into mask pixels such that each mask pixel includes a single pixel region. As a result, the mask pixels and the pixel regions are the same.

The electronics consider a sequence of the primitives. When considering a primitive, the electronics generate coverage data for the pixel regions associated with that primitive. As will become evident below, coverage data for a pixel region indicates whether that pixel region is covered by the shape such that one or more coverage criteria are satisfied or is not covered by the shape such that the coverage criteria are satisfied. However, in some instances, the coverage data generated from one primitive can change as a result of generating coverage data for a subsequent primitive. Accordingly, in some instances, coverage data generated for a primitive serves as preliminary coverage data until the preliminary coverage data has been generated for each primitive in the screen shape. Once the preliminary coverage data has been generated for each of the primitives, the preliminary coverage data can serve as the coverage data.

The electronics can employ one or more coverage criteria to generate the coverage data. An example of a suitable coverage criterion is whether the centroid of a pixel region is covered by the screen shape. For instance, a pixel region can be a covered region when the centroid of the pixel region is covered by the screen shape. Another example of a suitable coverage criterion is whether any portion of a pixel region is covered by the screen shape. For instance, a pixel region can be a covered region when a portion of the pixel region is covered by the screen shape and a pixel region can be an uncovered region when no portion of the pixel region is covered by the screen shape. Another example of a coverage criteria employs a coverage threshold percentage. A pixel region will be a covered region if the screen shape covers the threshold percentage or more than the threshold percentage of the pixel region and a pixel region will be an uncovered region if the screen shape covers less than the threshold percentage of the pixel region. In some instances, the threshold percentage is zero. In some instances, the threshold percentage is greater than zero.

Fill rules are also examples of coverage criteria that the electronics can employ to generate coverage data. The "odd-even" fill rule and the "non-zero" fill rule are examples of fill rules that the electronics can employ to identify covered regions and uncovered regions. Application of the "oddeven" fill rule and the "non-zero" fill rule to primitives so as to identify covered pixel regions and uncovered pixel regions is described in more detail below.

The electronics can apply one or more secondary coverage criteria to the coverage data determine whether a mask pixel is a covered pixel or an uncovered pixel. For instance, the electronics can determine that a mask pixel is a covered pixel when the number of pixel regions that are covered regions for that mask pixel is at least equal to a region threshold. The electronics can designate a mask pixel as an uncovered pixel when the number covered regions for that mask pixel is below the region threshold. A suitable region threshold includes, but is not limited to, 1. In some instances, the region threshold is greater than 1.

Application of the one or more secondary coverage criteria is optional. For instance, when the mask pixels include a single pixel region, application of the one or more secondary coverage criteria need not be employed. For instance, when a mask pixel consists of a single pixel region, covered regions are determined to be covered pixels and uncovered regions are determined to be uncovered pixels. Additionally, application of the one or more secondary coverage criteria can be combined with application of the one or more criteria. For instance, the electronics can identify covered regions for a mask pixel until the number of covered regions rises to the region threshold. Once the number of covered regions meets to the region threshold, the mask pixel is designated as a covered pixel and if the total number of covered regions for the mask pixel falls below the region threshold, the mask pixel is designated as an uncovered pixel. Since the electronics can employ the coverage data to determine whether each mask pixel is a covered pixel or an uncovered pixel, the coverage data also indicates whether a mask pixel is a covered pixel or an uncovered pixel.

The electronics store the coverage data in memory such as the shape buffer. For instance, the electronics can store data in the shape buffer that designates each mask pixel as a covered pixel or an uncovered pixel, and/or that identifies the pixel regions and whether each of the identified pixel regions is a covered region or an uncovered region, and/or that identifies the mask pixels and the number of pixel regions that are covered regions in each of the identified mask pixels or the number of pixel regions that are uncovered regions in each of the identified mask pixels. When the pixel mask is initialized such that each of the mask pixels is designated as an uncovered pixel such as shown in diagram A, the mask pixels that are identified as uncovered pixels are already designated as uncovered pixels. Accordingly, the electronics need only modify the shape buffer such that mask pixels that are identified as covered pixels are designated as covered pixels.

The coverage data generated from each of the primitives provides a pixel mask where each of the pixel regions are designated as a covered region or as an uncovered region. Diagram F in FIG. 2 illustrates a pixel mask that results from applying coverage criteria to the primitives in diagram D. For instance, the uncovered regions are shown as white while the covered regions are shown as gray.

The electronics use the screen shape to generate a bounds primitive that bounds the screen shape. For the purposes of illustration, diagram G illustrates the screen shape illustrated by dashed lines and the perimeter of the bounds primitive with solid lines. The solid lines bound the shape in screen coordinates. The bounds primitive can have a shape commonly employed by primitives. For instance, the bounds primitive can be a polygon such as a triangle, square or rectangle. Each vertex of the bounds primitive can be associated with data for various attributes such as position, color values and texture coordinates. Color attributes are generally specified by a red value, a green value, and a blue value (r, g, b). Texture coordinates are generally specified by horizontal and vertical coordinates (s and t) on a texture map. In screen coordinates, position attributes are generally specified as a horizontal coordinate and a vertical coordinate (x, y) but can also optionally include a depth coordinate (z) for use in hidden surface removal.

The electronics rasterize the bounds primitive into primitive pixels. Diagram H in FIG. 2 illustrates the screen shape rasterized into primitive pixels. Accordingly, diagram H represents the primitive rasterization. Each primitive pixel corresponds to a pixel on the screen. Accordingly, at least a portion of the mask pixels each corresponds to a primitive pixel and at least a portion of the primitive pixels are each associated with one or more pixel regions from the pixel mask. In some instances, each of the primitive pixels are each associated with one or more pixel regions from the pixel mask. In some instances, each of the mask pixels each corresponds to a primitive pixel and each of the primitive pixels corresponds to a mask pixel.

The electronics employ the pixel mask to screen the primitive pixels for additional processing. For instance, the electronics screens each of the primitive pixels that corresponds to a mask pixel for further processing. The electronics screen a primitive pixel by accessing the coverage data for the corresponding mask pixel from the shape buffer to determine whether the corresponding mask pixel is a covered pixel or an uncovered pixel. In some instances, the electronics apply the one or more secondary coverage criteria to the accessed coverage data to determine whether the corresponding pixel is a covered pixel or an uncovered pixel. For instance, the electronics can determine that the corresponding mask pixel is a covered pixel when the coverage data for that mask pixel indicates that the number of pixel regions for that mask pixel that are covered region is at or above the region threshold. The electronics can determine that the corresponding mask pixel is an uncovered pixel when the coverage data for that mask pixel indicates that the number of pixel regions for that mask pixel that are covered region is below the region threshold. When the electronics determine that the corresponding mask pixel is an uncovered pixel, the primitive pixel will not represent a portion of the screen shape on the screen and is accordingly a discarded pixel that is not processed further. When the electronics determine that the corresponding mask pixel is a covered pixel, the primitive pixel may represent a portion of the screen shape on the screen and is accordingly a retained pixel that is processed further. In some instances, whether a retained pixel represents a portion of a shape on the screen is a result of the subsequent processing of the retained pixel.

As noted above, when the electronics screen a primitive pixel, the electronics access the shape buffer to retrieve the coverage data for the corresponding mask pixel. After accessing the coverage data, the electronics can clear the portion of the shape buffer occupied by the accessed coverage data so that portion of the shape buffer is available for other data. In some instances, after employing coverage data for each mask pixel, the electronics clear the portion of the shape buffer occupied by the employed coverage data before the electronics access the shape buffer for coverage data for the next mask pixel. In some instances, after accessing coverage data for each of the mask pixels, the electronics clear the portion of the shape buffer occupied by the accessed coverage data before the electronics access the shape buffer for the coverage data for the next mask pixel. Clearing the shape buffer makes the shape buffer available for processing of additional screen shapes by the electronics. Accordingly, the electronics can begin to generate the next screen shape and the pixel mask for that shape while still processing the current shape.

As noted above, discarded pixels are not processed further while retained pixels are processed further. Examples of further processing of retained pixels include determination of pixel attributes. Each retained pixel can be associated with a set of pixel attributes. Examples of pixel attributes include color values and texture coordinates. For instance, retained pixels can each be associated with color values R, G, and B and/or with texture coordinates such as s and t. Suitable methods for generating the pixel attributes include interpolation between the vertices of the bounds primitive. For instance, texture coordinates and color values can be interpolated between the vertices of the bounds primitive. Each of the bounds primitive vertices can be associated with a set of vertice attributes such as R, G, B, s, t. The pixel attributes can be generated by interpolating between the vertices. In some instances, interpolation includes interpolating spatial gradients of the texture coordinates. An example of a spatial gradient of a texture coordinate is the partial derivative ds/dx where ds is the change in the texture coordinate per and dx is a move in the x direction in pixel coordinates. Accordingly, these gradients reflect the rate of change of texture coordinates relative to pixel coordinates. Suitable interpolation techniques include, but are not limited to, spherical linear interpolation, bi-linear interpolation, tri-linear interpolation, nearest neighbor interpolation, and Phong interpolation.

In some instances, the electronics perform set-up processing before performing the interpolation and before performing the screening and/or before performing the interpolation and after performing the screening. During the set-up processing, the electronics can generate parameters for the subsequent interpolation of attributes such as color and/or texture. For instance, the electronics can generate coefficients of equations used for the interpolation. In some instances, electronics generate the spatial gradients of the texture coordinates during the set-up processing.

In some instances, additional processing that can be performed on a retained pixel includes texture mapping. The spatial gradients of texture coordinates can be employed in the texture mapping. For instance, each texture can be associated with a plurality of MIP (multum in parvo) maps that each has a different resolution of textels. The spatial gradients of texture coordinates can be used to identify the MIP map that is correct for a particular primitive pixel or for a particular collection of primitive pixels.

Additional processing that can be performed on a retained pixel can also include blending. The blending can include anti-aliasing. After blending, the electronics can render the image on the display screen.

In some instances, the functions illustrated in FIG. 2 are executed in hardware. For instance, the electronics can hardware to generate the shape, to convert the shape to screen coordinates, to generate the pixel mask, to generate the coverage data, to store the coverage data in the shape buffer, to generate the bounds primitive, to rasterize the bounds primitive, to perform set-up processing, to perform the pixel screening, to clear portions of the shape buffer, and to perform interpolation. In one example, the electronics employ hardware to generate the pixel masks, to rasterize the bounds primitive, and screen the primitive pixels. In one example, the electronics employ hardware to store the coverage data in the shape buffer, and to clear portions of the shape buffer.

As noted above, the coverage data indicates whether each pixel region in a primitive is a covered region or an uncovered region. Fill rules can be employed to determine whether a pixel region is a covered region or an uncovered region. The oddeven rule is an example of a fill rule for determining whether a pixel region is a covered region or an uncovered region. The oddeven rule determines whether a point in or around a screen shape is a covered point or an uncovered point by drawing a ray from that point to infinity in any direction. The number of path segments in the screen shape that crosses the ray is counted. If the resulting number is odd, the point is a covered point. If this number is even, the point is an uncovered point. The point can be located in a pixel region. For instance, the point can be the centroid of a pixel region. When the point is located in a pixel region and the rule determines that the point is a covered point, the pixel region can be a covered region. When the point is located in a pixel region and the rule determines that the point is an uncovered point, the pixel region can be an uncovered region.

Figure 3:
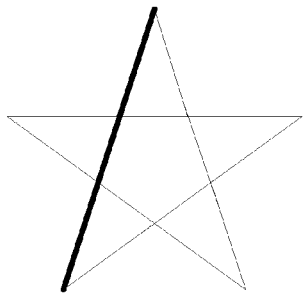
FIG. 3 illustrates decomposition of a screen shape into primitives.
Figure 3:
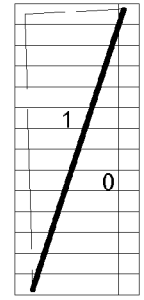
Figure 3:
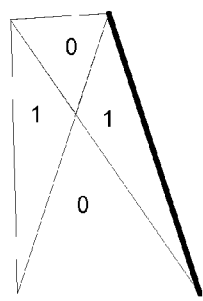
Figure 3:
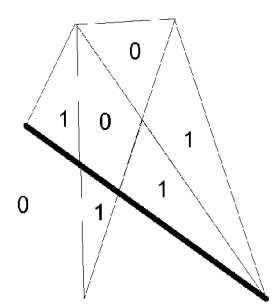
Figure 3:
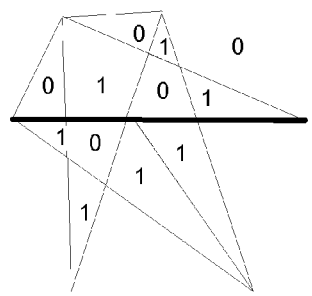
Figure 3:
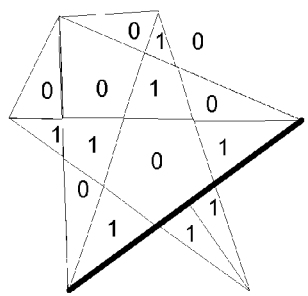
Figure 3:
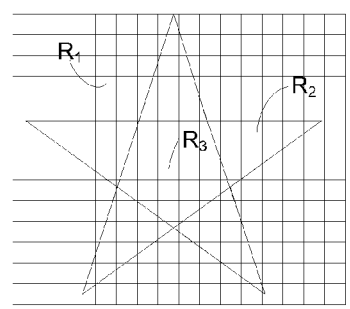

FIG. 3 illustrates decomposition of a screen shape into primitives. FIG. 3 also illustrates application of the oddeven rule to the primitives so as to determine whether a pixel region is a covered region or an uncovered region. Diagram A in FIG. 3 illustrates the screen shape. The screen shape is decomposed into a series of primitives. The triangle in diagram B represents the first primitive for the screen shape shown in diagram A. The dark line in diagram B corresponds to the darkened edge in diagram A. The primitive in diagram B is rastersized into pixel regions that are each outlined by a dashed line. The electronics can associate each pixel region with preliminary coverage data. The preliminary coverage data for a pixel region can be a zero or a one. Accordingly, a single bit in the shape buffer can represent the preliminary coverage data for a pixel region. Each time a pixel region is covered by a primitive, the preliminary coverage data for the pixel region is changed from zero to one or from one to zero. As noted above, the pixel mask can be initialized such that each of the pixel regions is an uncovered region. Accordingly, the pixel mask can be initialized such that the preliminary coverage data for the pixel region is zero. Since the primitive represented by diagram B in FIG. 3 represents the first primitive considered by the electronics, the preliminary coverage data for each of the pixel regions covered by the primitive is set to one while the preliminary coverage data for each of the pixel regions that is not covered by the primitive remain at zero.

As is evident from diagram B, a pixel region can be only partially covered by the primitive. As a result, one or more coverage criteria are employed to determine whether a pixel region is classified as being covered by the primitive. An example of a suitable coverage criterion is whether the centroid of the pixel region is covered by the primitive. For instance, a pixel region can be considered covered when the centroid of the pixel region is covered by the primitive. Another example of a suitable coverage criterion is whether any portion of a pixel region is covered by the screen shape or the primitive. For instance, a pixel region can be considered covered when a portion of the pixel region is covered by the primitive or the shape and a pixel region can be considered uncovered when no portion of the pixel region is covered by the primitive or the shape. Another example of a coverage criterion employs a coverage threshold percentage. A pixel region will be considered covered if the primitive covers a percentage of the pixel region that is equal to or greater than the threshold percentage and a pixel region will be considered uncovered if the primitive covers a percentage of the pixel region that is less than the threshold percentage.

Diagram C in FIG. 3 shows the second primitive in the shape superimposed on the primitive of diagram B. The dark line in diagram C corresponds to an edge in the screen shape of diagram A. The pixel regions are not shown in diagram C in order to simplify the diagrams. The electronics change the preliminary coverage data for the pixel regions that are covered by the current primitive and a prior primitive from the current value to the opposite value (from zero to one or from one to zero). The electronics also changes the preliminary coverage data for the pixel regions that are covered by the current primitive but not by a prior primitive from zero to one. The electronics leave the preliminary coverage data for the remaining pixel regions intact. Accordingly, each of the polygons in diagram C has a label of zero or one that indicates the value of the preliminary coverage data for the pixel regions covered by the polygon. The polygon labeled zero is overlapped by the first primitive and the second primitive while the polygons labeled 1 are overlapped by only the first primitive or only the second primitive.

Diagram D illustrates a third primitive for the screen shape superimposed on the previous primitives. Diagram E illustrates a fourth primitive for the screen shape superimposed on the previous primitives. Diagram F illustrates a fifth primitive for the screen shape superimposed on the previous primitives. The dark lines in diagram D, diagram E, and diagram F each corresponds to a different one of the edges in the screen shape of diagram A. Each of the polygons in diagram D, diagram E, and diagram F has a label of zero or one that indicates the value of the preliminary coverage data for the pixel regions covered by the polygon. The values of the preliminary coverage data are determined using the rules described above.

Diagram F illustrates the final primitive for the screen shape. As a result, once the values of the preliminary coverage data are determined for the fifth primitive, the preliminary coverage data in the shape buffer from each of the primitives serves as the coverage data. Accordingly, the preliminary coverage data shown in diagram F for each of the primitives serves as the coverage data.

According to the oddeven rule, pixel regions covered by a polygon with even coverage data are uncovered regions while pixel regions covered by a polygon with odd coverage data are covered regions. FIG. 3 illustrates the application of the oddeven rule to the coverage data shown in diagram F. For instance, comparing diagram G and F shows that the pixel regions labeled $R_1$ and $R_3$ in diagram G are each covered by a polygon labeled 0. Accordingly, the pixel region labeled $R_1$ and $R_3$ in diagram G are each an uncovered pixel. In constrast, the pixel region labeled $R_2$ in diagram G is covered by a polygon labeled 1. Accordingly, the pixel region labeled $R_2$ in diagram G is a covered pixel. Further comparison of diagram G and F shows that the pixel regions identified as covered regions combine to yield the screen shape shown in diagram A.

Another example of a fill rule is the "non-zero" rule. The non-zero rule determines whether a point in or around a screen shape is a covered point or an uncovered point by drawing a ray from that point to infinity in any direction and then examining the places where a segment of the shape crosses the ray. Starting with a count of zero, one is added each time a segment of the screen shape crosses the ray from left to right and one is subtracted each time a segment of the screen shape crosses the ray from right to left. After counting the crossings, if the result is zero then the point is an uncovered point. If the result is non-zero then the point is an uncovered point.

Figure 4:
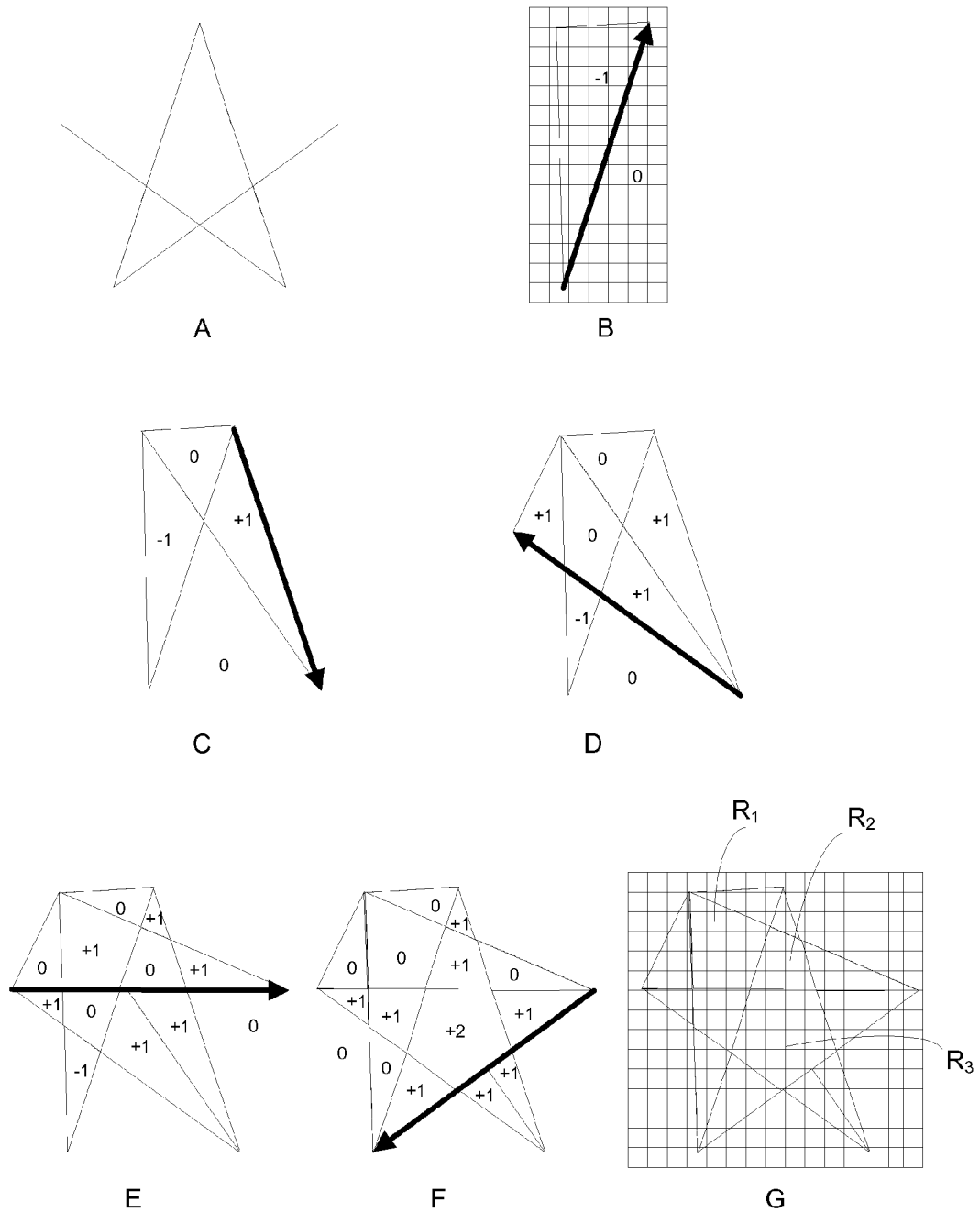
FIG. 4 illustrates decomposition of a screen shape into primitives.

FIG. 4 illustrates decomposition of a screen shape into primitives. FIG. 4 also illustrates application of the non-zero rule to the primitives so as to determine whether a pixel region is a covered region or an uncovered region. Diagram A in FIG. 4 illustrates the screen shape. The screen shape is decomposed into a series of primitives. The triangle in diagram B represents the first primitive for the screen shape shown in diagram A. The dark ray in diagram B corresponds to the darkened edge in diagram A. The primitive in diagram B is rastersized into pixel regions that are each outlined by a dashed line.

The electronics identify the winding direction for the primitive shown in diagram B. The winding direction refers to the direction that the ray indicates around the perimeter of the primitive. The winding direction can be clockwise or counter-clockwise. For instance, the ray in the primitive of diagram B indicates counter-clockwise winding.

The electronics associate each pixel region with preliminary coverage data. The pixel mask is initialized such that the preliminary coverage data for each pixel region is set to zero. The preliminary coverage data for a pixel region that is covered by a primitive with counter-clockwise winding is decremented by one and the preliminary coverage data for a pixel region that is covered by a primitive with clockwise winding is incremented by one. Accordingly, the preliminary coverage data for each of the pixel regions covered by the primitive in diagram B is set to –1 while the preliminary coverage data for each of the pixel regions that are not covered by the primitive remain at zero.

As is evident from diagram B, a pixel region can be only partially covered by the primitive. As a result, one or more coverage criteria are employed to determine whether a pixel region is classified as being covered by the primitive. An example of a suitable coverage criterion is whether the centroid of the pixel region is covered by the primitive. For instance, a pixel region can be considered covered when the centroid of the pixel region is covered by the primitive. Another example of a suitable coverage criterion is whether any portion of a pixel region is covered by the screen shape or the primitive. For instance, a pixel region can be considered covered when a portion of the pixel region is covered by the primitive or the shape and a pixel region can be considered uncovered when no portion of the pixel region is covered by the primitive or the shape. Another example of a coverage criterion employs a coverage threshold percentage. A pixel region will be considered covered if the primitive covers a percentage of the pixel region that is equal to or greater than the threshold percentage and a pixel region will be considered uncovered if the primitive covers a percentage of the pixel region that is less than the threshold percentage.

Diagram C in FIG. 4 shows the second primitive in the shape superimposed on the primitive of diagram B. The ray in diagram C corresponds to an edge in the screen shape of diagram A. The pixel regions are not shown in diagram C in order to simplify the diagrams. The electronics identify the winding direction for the second primitive. For instance, the ray indicates that the primitive of diagram C has clockwise winding. As a result, the electronics increment the preliminary coverage data for each of the pixel regions covered by the current primitive by one and leave the preliminary coverage data for the remaining pixel regions intact. Accordingly, the polygon in diagram C that is covered by both the first primitive and the second primitive has a label of 0 to indicate the value of the preliminary coverage data for the pixel regions covered by that polygon. The polygon in diagram C that is covered by only the first primitive has a label of –1 to indicate the value of the preliminary coverage data for the pixel regions covered by that polygon. The polygon in diagram C that is covered by only the second primitive has a label of +1 to indicate the value of the preliminary coverage data for the pixel regions covered by that polygon.

Diagram D illustrates a third primitive for the screen shape superimposed on the previous primitives. Diagram E illustrates a fourth primitive for the screen shape superimposed on the previous primitives. Diagram F illustrates a fifth primitive for the screen shape superimposed on the previous primitives. The dark lines in diagram D, diagram E, and diagram F each corresponds to a different one of the edges in the screen shape of diagram A. The electronics identifies whether each primitive is clockwise wound or counter-clockwise wound and increments the preliminary coverage data for the pixels regions covered by the primitive accordingly. For instance, each of the polygons in diagram D, diagram E, and diagram F has a numeric label that indicates the value of the preliminary coverage data for the pixel regions covered by the polygon.

Diagram F illustrates the final primitive for the screen shape. As a result, once the values of the preliminary coverage data are determined for the fifth primitive, the preliminary coverage data in the shape buffer from each of the primitives serves as the coverage data. Accordingly, the preliminary coverage data shown in diagram F for each of the primitives serves as the coverage data.

According to the non-zero rule, pixel regions covered by a polygon with coverage data of zero are uncovered regions while pixel regions covered by a polygon with non-zero coverage data are covered regions. FIG. 4 illustrates the application of the non-zero rule to the coverage data shown in diagram F. For instance, comparing diagram G and F shows that the pixel regions labeled $R_1$ is covered by a polygon labeled 0. Accordingly, the pixel region labeled $R_1$ is an uncovered pixel. In constrast, the pixel region labeled $R_2$ in diagram G is covered by a polygon labeled 1 and the pixel region labeled $R_3$ in diagram G is covered by a polygon labeled 2. Accordingly, the pixel region labeled $R_2$ and the pixel region labeled $R_3$ in diagram G are covered pixels. Further comparison of diagram G and F shows that the pixel regions identified as covered regions combine to yield the screen shape shown in diagram A.

We can take the shape buffer results in FIG. 4 diagram F and apply a non-zero test to implement the non-zero fill rule. Pixel regions covered by a polygon with coverage data of zero are uncovered regions while pixel regions covered by a polygon with non-zero coverage data are covered regions. Comparing FIG. 4 diagrams G and F shows that the pixel regions labeled $R_1$ are covered by a polygon labeled 0. Accordingly, the pixel region labeled $R_1$ is an uncovered pixel. In contrast, the pixel region labeled $R_2$ in diagram G is covered by a polygon labeled 1 and the pixel region labeled $R_3$ in diagram G is covered by a polygon labeled 2. Accordingly, the pixel region labeled $R_2$ and the pixel region labeled $R_3$ in diagram G are covered pixels. Depending on the test applied different combinations of $R_1$ $R_2$ & $R_3$ may be filled. Testing the least significant bit for an odd-even test would produce the odd-even result of the odd-even fill rule. Testing for equality or inequality with a specific value could discriminate any chosen region and testing for values greater than or greater than or equal to a specific value could fill above or below an overlap threshold. Combinations of tests could be done simultaneously for example below a threshold but greater than zero is an interesting test. With our example shape buffer result we could chose to fill a solid star, the points of a star, the pentagon inside the star, the exterior of the star or the exterior+pentagon of the star all from this single mask. With additional values the fill choices are even more diverse. The test is implemented in FIG. 6 section process block 120.

As is evident from the discussion in conjunction with FIG. 4, in some instances, the preliminary coverage data can include negative numbers. Accordingly, the shape buffer can support negative numbers. Alternately, the shape buffer can employ overflow and underflow to achieve the same results.

FIG. 3 and FIG. 4 illustrate a scheme for decomposing the screens shape into primitives. However, other schemes for decomposing a screen shape into primitives can be employed particularly in the case of simpler and non-self intersecting screen shapes such as the direct one-time rasterization of supplied primitives to the shape buffer. Additionally multiple shapes could contribute to an aggregate shape by adding them to the shape buffer prior to final shading without clearing the shape buffer of earlier contents.

Figure 5:
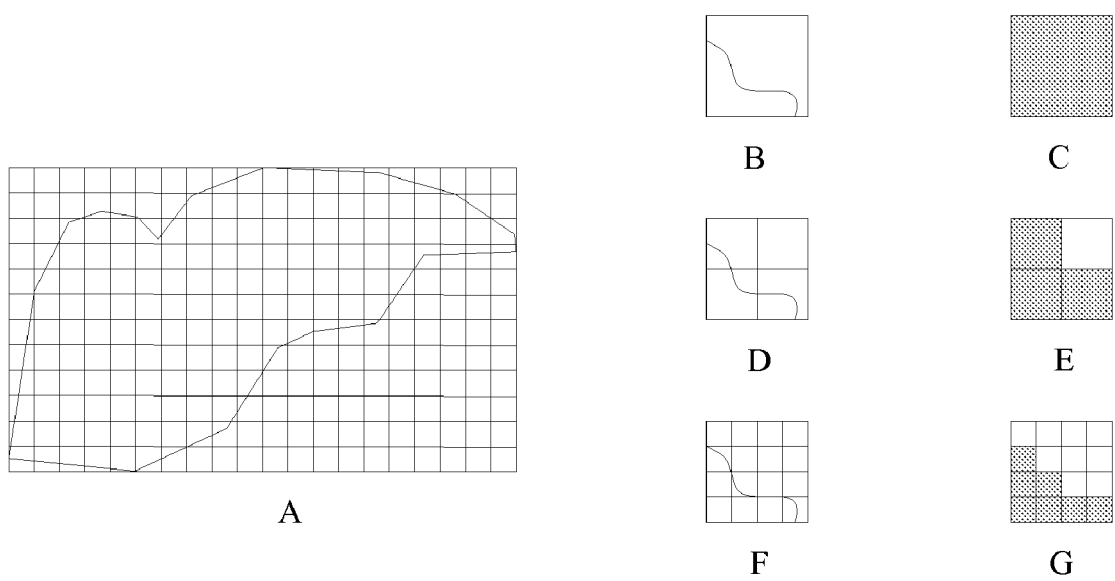
FIG. 5 illustrates generation of a pixel mask from a screen shape.

The electronics can generate fractional coverage data that indicates the fractional coverage of the mask pixels. For instance, the electronics can approximate the portion of a mask pixel covered by the screen shape by dividing each mask pixel into a plurality of pixel regions. For instances, the electronics can determine the fractional coverage of mask pixels or can determine one or more parameters that indicate the fractional coverage of the mask pixels. FIG. 5 illustrates the screen shape from FIG. 2 rasterized such that each mask pixel is divided into four pixel regions. Diagram B in FIG. 5 illustrates a single mask pixel. Diagram D illustrates the mask pixel of diagram B divided into four pixel regions. Diagram F in FIG. 5 illustrates the mask pixel of diagram B divided into sixteen pixel regions. Each pixel region has the same shape and size. A portion of a shape is shown covering the pixel illustrated in diagram B, diagram D, and diagram F. As noted above, each pixel region can be a covered region or an uncovered region. The electronics can count the number of covered regions associated with a particular mask pixel. The number of pixel regions that are covered regions indicates the fractional coverage of the mask pixel when the total number of pixel regions per mask pixel are known. For instance, the number of mask regions that are covered pixels are the numerator in the fractional coverage while the total number of mask regions per mask pixel serves as the denominator. The fractional coverage data can be employed for anti-aliasing. For instance, the fractional coverage can be employed in blending operations such as Porter Duff blending.

In some instances, the electronics store the fractional coverage data in the shape buffer along with the coverage data. As noted above, the coverage data stored in the shape buffer can identify the mask pixels and the number of pixel regions that are covered regions and/or uncovered regions in each of the identified mask pixels. Since the number of pixel regions in a mask pixel that that are covered regions and/or uncovered regions can indicate the fractional coverage of the mask pixels, the fractional coverage data can serve as the coverage data and/or the coverage data can serve as the fractional coverage data.

Figure 6:
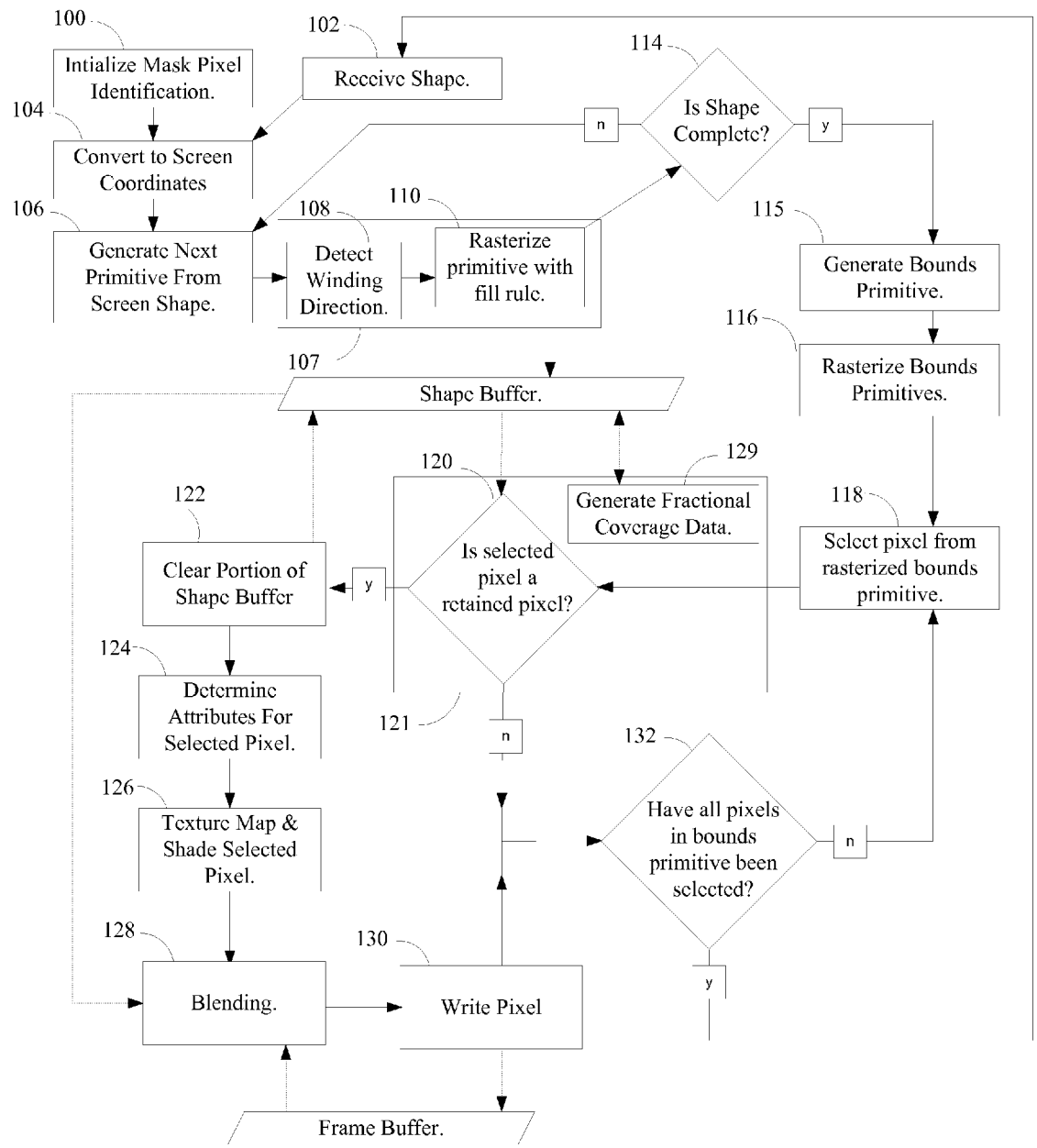
FIG. 6 illustrates a method of operating a graphics system.

FIG. 6 illustrates a method of operating the graphics system. The dashed lines illustrate data transfers. At process block 100, the electronics initialize the shape buffer. For instance, the electronics can initialize the shape buffer such that each mask pixel is designated as an uncovered pixel. For instance, when the electronics employ the oddeven rule or the non-zero rule, the electronics can set the coverage data for each mask pixel to zero.

At process block 102, the electronics receive the shape description. At process block 104 the shape is converted to screen coordinates. Accordingly, the electronics convert the shape to the screen shape. At process block 106, the next primitive in the screen shape is generated. At process block 107, the coverage data are generated for the pixel regions in the primitive. For instance, when the non-zero rule is employed, the electronics can identify the winding direction for the primitive at process block 108. At process block 110, the primitive can be rasterized into pixel regions and a fill rule applied to the pixel regions to generate preliminary coverage data for the pixel regions. The preliminary coverage data is stored in the shape buffer as a result of applying the fill rule.

At determination block 114, a determination is made whether each of the primitives in the shape has been rasterized. When the determination is negative, the electronics return to process block 106. When the determination is positive, the preliminary coverage data stored in the shape buffer serves as the coverage data and the electronics proceed to process block 115. At process block 115, the electronics employ the screen shape to generate a bounds primitive. The bounds primitive bounds the screen shape. At process block 116, the electronics rasterize the bounds primitive into primitive pixels such that each primitive pixel corresponds to a pixel on the screen.

At process block 118, the electronics select a primitive pixel. At determination block 120, a determination is made whether the selected primitive pixel is a discarded pixel or a retained pixel. For instance, the electronics can access the shape buffer for the coverage data associated with the one or more pixel regions in the mask pixel that corresponds to the selected primitive pixel. The electronics can apply a fill rule to the accessed coverage data to determine whether each pixel region is a covered pixel or an uncovered pixel. In particular, the electronics can apply a fill rule to coverage data developed according to the method shown in FIG. 4. For instance, the electronics can apply the non-zero fill rule or the oddeven fill rule to coverage data developed according to the method shown in FIG. 4. In some instances, the electronics also apply the one or more secondary coverage criteria to the accessed coverage data to determine whether the corresponding mask pixel is a covered pixel or an uncovered pixel. For instance, when the mask pixels include only one pixel region and the coverage data indicates that that pixel region is covered region, the electronics can determine that the corresponding mask pixel is a covered pixel but when the coverage data indicates that that pixel region is an uncovered region, the electronics can determine that the corresponding mask pixel is an uncovered pixel. As another example, when the mask pixels each include a plurality of pixel regions, the electronics can count the number of pixel regions for the corresponding mask pixel that are covered regions. When the count is at or above the region threshold, the electronics can determine that the corresponding mask pixel is a covered pixel but when the count is below the region threshold, the electronics can determine that the corresponding mask pixel is an uncovered pixel. Alternately, the electronics can access coverage data that indicates the number of pixel regions for the corresponding mask pixel that are covered regions or uncovered regions. The electronics can then compare this number to the region threshold. When the selected pixel corresponds to a mask pixel that is a covered pixel, the selected pixel is a retained pixel. When the corresponding mask pixel is an uncovered pixel, the selected pixel is a discarded pixel. The determination at process block 120 could be performed in hardware before the shading fill, could be performed as a stencil operation before or after shading fill or could be performed in a programmable shader.

When the electronics determine that the selected pixel is a retained pixel at determination block 120, the electronics proceed to process block 122. At process block 122, the electronics clear all or a portion of the shape buffer that was occupied by the coverage data that was accessed at determination block 120 such that the cleared portion of the shape buffer is available to receive other data. In one example, the portion of the shape buffer is cleared so as to be available to receive coverage data for other shapes. For instance, the selected mask pixel can be re-designated as an uncovered pixel so that portion of the shape buffer can be employed for other shapes. These steps would result in the each of the mask pixels designated as a covered pixel at process block 110 being re-designated as an uncovered pixel before the next shape is processed. As a result, process block 122 effectively performs the same function as process block 100 by independently designating each of the mask pixels in the pixel mask as an uncovered pixel before processing the mask pixel in conjunction with the next shape. Accordingly, the electronics can be generating coverage data for one shape while screening the primitive pixels for another shape.

At process block 124, the electronics determine attributes for the selected primitive pixel. The pixel attributes can include color and texture for the retained pixel. For instance, the electronics can interpolate the color and texture attributes for the selected pixel between the color and texture attributes between the color and texture attributes for vertices of the bounds primitive. At process block 126, the electronics can perform texture mapping for the retained pixel to determine the texture for the selected pixel.

The electronics can perform blending at process block 128. Blending can include accessing fractional coverage data from memory such as the shape buffer and/or a frame buffer. The fractional coverage data can be employed in blending methods such as Porter Duff blending. After accessing the fractional coverage data, the electronics can clear the portion of the shape buffer that was occupied by the accessed coverage data.

The fractional coverage data accessed at process block 128 can be generated at process block 129 and stored in the shape buffer. The generation of the fractional coverage illustrated at process block 129 can be performed at a variety of different times in the method. For instance, the fractional coverage data can be generated at a time between process block 107 and process block 128. For instance, the fractional coverage data can be generated at determination block 120, at process block 107, or as part of performing the blending at process block 128.

The fractional coverage data generated by process block 129 can employ the test used by process block 120 on sub pixel data to determine if a sample contributes to the fractional coverage. This hardware affinity is encapsulated by process block 121. The test in 120 may be a fill-rule test on pixel data, a test on sub-sample data, a test upon aggregate sub-sample results within a single pixel or a test upon fractional coverage results depending upon where and when fractional coverage is calculated according to the fill-rules described above. When sub-samples are tested, the test applied by process block 120 may differ for sub-samples than for pixels. For example, sub-samples can be tested as described in the context of FIG. 4 but pixels will be tested based on aggregate sub-sample results or fractional coverage generated from those aggregate results. The fractional coverage or aggregate supersample results may be stored back to the shape buffer by process block 129 or used immediately where generated on demand by process block 118.

At process block 130, the electronics can store data for the selected pixel in memory such as a frame buffer. For instance, the electronics can store R, G, B and alpha values for the pixel in a frame buffer.

When the electronics determine that the selected pixel is a discarded pixel at determination block 120, the electronics proceed to process block 130. Additionally, the electronics proceed from process block 130 to determination block 132. At determination block 132, the electronics make a determination whether each of the primitive pixels has been selected. When the determination is negative, the electronics return to process block 118. When the determination is positive, the electronics return process block 100.

The process blocks and determination blocks in FIG. 6 can be executed in an order other than the illustrated order. For instance, as noted above, the fractional coverage data generated at process block 129 can be generated at a variety of different places in the method. For instance, the electronics can determine whether a mask pixel is a covered pixel or an uncovered pixel before determination block 120 and store the results of the determination in a memory. The electronics can then access the data indicating whether the mask pixel at process block 120.

In some instances, one or more of the process blocks are optional. For instance, it is occasionally desirable to apply multiple textures to a shape. Accordingly, it may be desirable to proceed from determination block 132 to process block 114 in the event that the determination at determination block 132 is positive. However, if the electronics return to process block 114, the illustrated method cannot be correctly executed since the shape buffer has been cleared at process block 122. As a result, process block 122 is optional. In another example of the method, process block 122 is not executed and the electronics proceeds from determination block 132 to process block 100. As another example, generating the fractional coverage at process block 112 may be optional when alternative blending strategies such as an A-buffer are employed.

Although FIG. 2 and FIG. 6 are disclosed in the context of a pixel mask that is divided into mask pixels, the methods can be performed by dividing the pixel mask into pixel regions. For instance, the pixel mask can be divided into mask pixels with each mask pixel divided into a plurality of pixel regions. Additionally, the primitives can be divided into mask pixels with each mask pixel divided into a plurality of pixel regions. The pixel mask can be initialized such that each of the pixel regions is an uncovered region.

Figure 7:
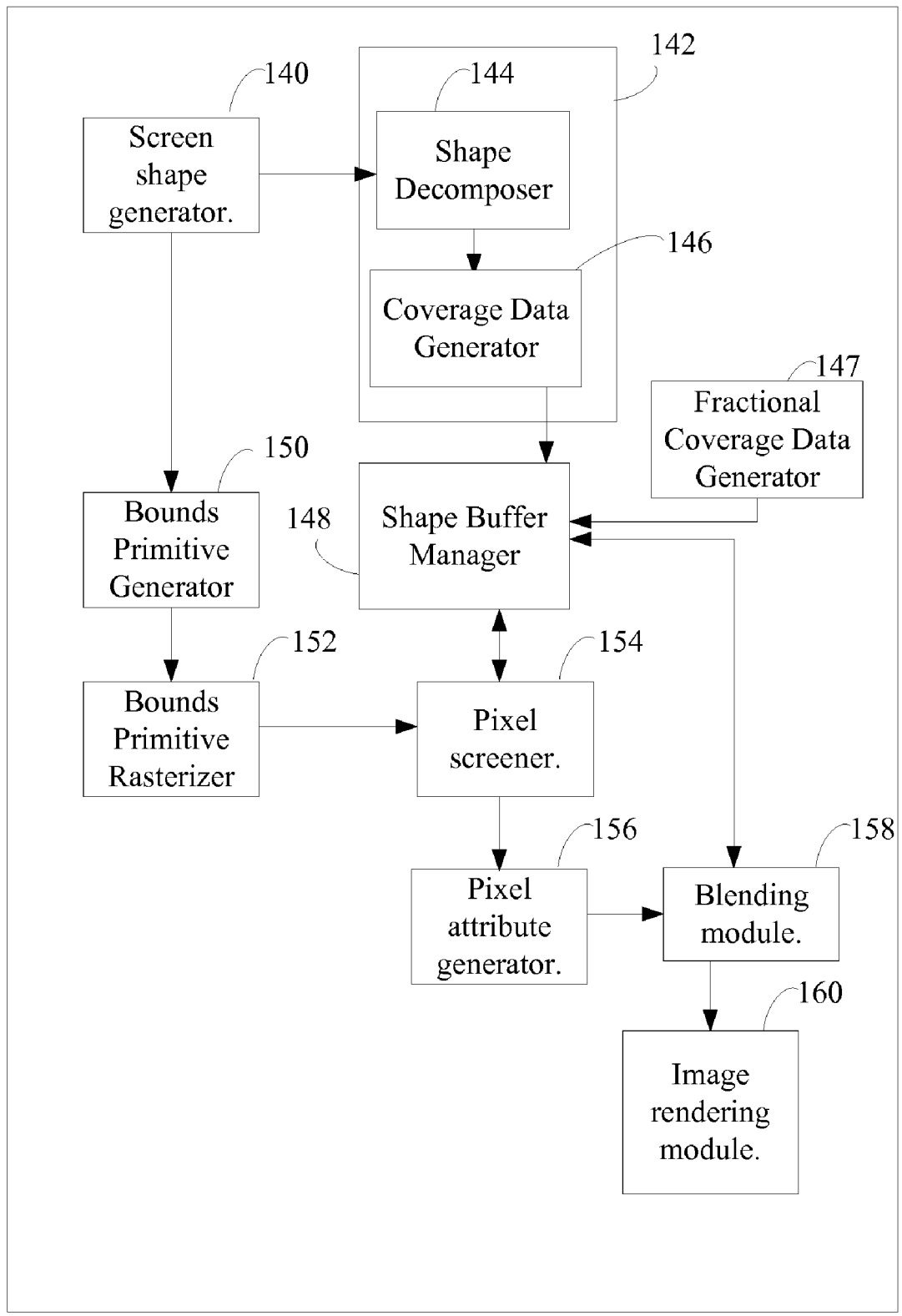
FIG. 7 is a logic flow diagram showing logic modules for operating a graphics system.

FIG. 7 is a logic flow diagram showing logic modules for operating a graphics system. The electronics include a screen shape generator 140. The screen shape generator can receive the shape description and generate the screen shape from the shape description. The electronics include a pixel mask generator 142 for generating the pixel mask from the screen shape. The pixel mask generator 142 can include a shape decomposer 144 for decomposing the screen shape into primitives. The pixel mask generator can include a primitive rasterizer for rasterizing the primitives into mask pixels. The pixel mask generator also includes a coverage data generator 146 for generating the coverage data. In particular, the coverage data generator can identify the mask pixels in a primitive that are covered pixels or uncovered pixels.

The electronics can optionally include a fractional coverage data generator 147 for generating the fractional coverage data.

The electronics include a shape buffer manager 148 for managing the shape buffer. The shape buffer manager can store the coverage data and/or the fractional coverage data in the shape buffer. Additionally, the shape buffer manager can clear portions of the shape buffer such that the cleared portion of the shape buffer can receive additional data as described above.

The electronics also include a bounds primitive generator 150 for generating the bounds primitive from the screen shape. The electronics also include a bounds primitive rasterizer 152 for rasterizing the bounds primitive into primitive pixels.

The electronics include a pixel screener 154 configured to screen the primitive pixels for retained pixels and discarded pixels. The pixel screener has access to data from the shape buffer. When a primitive pixel corresponds to a mask pixel that is a covered pixel, the primitive pixel is a retained pixel. When the corresponding mask pixel is an uncovered pixel, the primitive pixel is a discarded pixel.

The electronics include a pixel attribute generator 156 that generates attributes for the retained pixels. The pixel attributes can include the color and texture for the retained pixels.

The electronics include a blending module 158 that can be configured to provide anti-aliasing of the image. In some instances, the blending module 158 has access to data from the image screener. The blending module can optionally access the fractional coverage data from the shape buffer. The electronics include an image rendering module 160 for rendering the image on the screen.

All or a portion of the logic modules illustrated in FIG. 7 can be implemented in hardware. For instance, the screen shape generator 140, the pixel mask generator 142, the coverage data generator 144, the fractional coverage data generator 147, the shape buffer manager 148, the bounds primitive generator 150, the bounds primitive rasterizer 152, the pixel screener 154, and the pixel attribute generator 156 can each be implemented in hardware.

The electronics can include modules in addition to the illustrated modules. For instance, the electronics can include a z-buffer module for performing z-testing and a stencil module for performing stencil testing. The z-buffer module can ensure that overlapping shapes in the image overlap correctly. For instance, the z-buffer module can ensure that the shape closest to the front of the image is the image that is actually viewed on the screen. The z-buffer module is most useful when the shape description is three dimensional and may not be required when the shape description is two-dimensional.

Although the disclosures are in the context of a destination that is a two-dimensional display screen, the principles of the invention can be applied to destinations with higher orders of dimensionality. For instance, the principles of the invention can be applied to three-dimensional modeling technologies. All or a portion of one or more methods described above can be executed by the graphics system and/or by the electronics in the graphics system. Further, the controller can cause the electronics and/or the graphics system to execute all or a portion of one or more of the above methods. When the electronics include a computer-readable medium, the controller can execute the instructions on the computer-readable medium. The instructions can cause the controller to execute all or the portion of one or more methods disclosed above. Additionally, all or a portion of one or more of the above methods can be executed by systems and devices other than the graphics system.

Those of skill in the art would understand that information and signals may be represented using any of a variety of different technologies and techniques. For example, data and instructions that may be referenced throughout the above description may be represented by voltages, currents, electromagnetic waves, magnetic fields or particles, optical fields or particles, or any combination thereof.

Those of skill would further appreciate that the various illustrative logical blocks, circuits, and method steps described in connection with the embodiments disclosed herein may be implemented as electronic hardware, computer software, or combinations of both. To clearly illustrate this interchangeability of hardware and software, various illustrative components, blocks, logic, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, logic, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer-readable medium known in the art. An exemplary storage computer-readable medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
a shape buffer manager configured to store coverage data in a shape buffer;
a screen shape converter configured to convert a shape description into screen coordinates defining a screen shape;
a bounds primitive generator configured to generate a single bounds primitive from the screen shape wherein the bounds primitive bounds the screen shape;
a bounds primitive rasterizer configured to rasterize the bounds primitive into a plurality of primitive pixels wherein each primitive pixel corresponds to a screen pixel;
a pixel mask generator configured to decompose the screen shape into screen space primitives and to rasterize each screen space primitive into a plurality of mask pixels, wherein each mask pixel is divided into one or more pixel regions and each mask pixel corresponds to one of the primitive pixels, and wherein the pixel mask generator is also configured to classify each pixel region as a covered region or an uncovered region according to a coverage criterion and classify each mask pixel as a covered mask pixel or uncovered mask pixel according to a secondary coverage criterion, wherein the pixel mask generator generates the coverage data based on the classifications, and wherein the pixel mask generator is also configured to combine the coverage data for each successive screen space primitive with the coverage data for the previous screen space primitives to produce the coverage data for the screen shape; and
a pixel screener configured to employ the coverage data from the shape buffer to screen the primitive pixels into retained pixels and discarded pixels,
the retained pixels each corresponding to one of the mask pixels that the coverage data indicates is a covered pixel, and
the discarded pixels each corresponding to one of the mask pixels that the coverage data indicates is an uncovered pixel,
wherein at least one of the shape buffer manager, screen shape converter, bounds primitive generator, bounds primitive rasterizer, pixel mask generator, and pixel screener is implemented at least partially in hardware.

2. The apparatus of claim 1, wherein the one or more coverage criteria are satisfied for each of the mask pixels when a centroid of the mask pixel is covered by the shape and are not satisfied when a centroid of the mask pixel is not covered by the shape.

3. The apparatus of claim 1, wherein the coverage data indicates that one of the mask pixels is a covered pixel when a number of pixel regions in the mask pixel exceeds or is at a threshold and that the mask pixel is an uncovered pixel when the number of pixel regions in the mask pixel is below a threshold.

4. The apparatus of claim 1, further configured to generate pixel attributes for the primitive pixel when the primitive pixel is retained pixel and also configured to refrain from generating pixel attributes when the primitive pixel is discarded.

5. The apparatus of claim 4, wherein at least a portion of the pixel attributes are generated by interpolating between attributes associated with vertices of the bounds primitive.

6. The apparatus of claim 4, wherein the pixel attributes include color values.

7. The apparatus of claim 1, wherein the bounds primitive rasterizer is implemented by hardware, the pixel screener is implemented by hardware, and the shape buffer manager is implemented by hardware.

8. The apparatus of claim 1, wherein employing the coverage data from the shape buffer to screen the primitive pixels includes accessing first coverage data for a first one of the mask pixels before accessing second coverage data for a second one of the mask pixels, and
the shape buffer manager is configured to clear at least a portion of the shape buffer occupied by at least a portion of the first coverage data after accessing the first coverage data and before accessing the second coverage data.

9. The apparatus of claim 8, wherein the first coverage data designates the first one of the mask pixels as a covered pixel and clearing the portion of the shape buffer includes changing the first coverage data such that the first one of the mask pixels is designated as an uncovered pixel.

10. The apparatus of claim 1, further comprising:
a fractional coverage generator configured to generate one or more variables that indicate fractional coverage of the mask pixels, the fractional coverage indicating the portion of a mask pixel that is covered by the shape.

11. The apparatus of claim 10, wherein generating the one or more variables that indicate fractional coverage of a mask pixel includes determining the number pixel regions in the mask pixel that are covered regions,
a pixel region being a covered region when the shape covers the pixel region such that one or more coverage criteria is satisfied.

12. The apparatus of claim 11, further comprising:
a blending module configured to employ the one or more variables that indicate fractional coverage in anti-aliasing the shape.

13. A method of operating a graphics system, the method being executed by a computer or processor, comprising:
storing in a shape buffer coverage data for mask pixels;
converting, with the computer or processor, a shape description into screen coordinates defining a screen shape;
generating, with the computer or processor, a single bounds primitive from the screen shape wherein the bounds primitive bounds the screen shape;
rasterizing, with the computer or processor, the bounds primitive into a plurality of primitive pixels wherein each primitive pixel corresponds to a screen pixel;
decomposing, with the computer or processor, the screen shape into screen space primitives;
rasterizing, with the computer or processor, each screen space primitive into a plurality of mask pixels, wherein each mask pixel is divided into one or more pixel regions and each mask pixel corresponds to one of the primitive pixels;
classifying, with the computer or processor, each pixel region as a covered region or an uncovered region according to a coverage criterion;
classifying, with the computer or processor, each mask pixel as a covered mask pixel or uncovered mask pixel according to a secondary coverage criterion;

generating, with the computer or processor, the coverage data based on the classifications according to the coverage criterion and the secondary coverage criterion;
combining, with the computer or processor, the coverage data for each successive screen space primitive with the coverage data for the previous screen space primitives to produce the coverage data for the screen shape; and
screening, with the computer or processor, the primitive pixels into retained pixels and discarded pixels,
the retained pixels each corresponding to one of the mask pixels that the coverage data indicates is a covered pixel, and
the discarded pixels each corresponding to one of the mask pixels that the coverage data indicates is an uncovered pixel.

14. The method of claim 13, further comprising:
generating pixel attributes for the retained primitive pixels and refraining from generating pixel attributes for the discarded primitive pixels.

15. The method of claim 13, wherein at least a portion of the pixel attributes are generated by interpolating between attributes associated with vertices of the bounds primitive.

16. The method of claim 15, wherein the pixel attributes include color values.

17. The method of claim 13, further comprising:
generating one or more variables that indicate fractional coverage of the mask pixels, the fractional coverage being the portion of a mask pixel that is covered by the shape.

18. The method of claim 17,
wherein generating the one or more variables that indicate fractional coverage of the mask pixels includes determining the number pixel regions in the mask pixel that are covered regions, a pixel region being a covered region when the shape covers the mask pixel such that one or more coverage criteria is satisfied.

19. A non-transitory computer-readable storage medium having a set of computer-executable instructions for causing a computer to:
store in a shape buffer coverage data for mask pixels;
convert a shape description into screen coordinates defining a screen shape;
generate a single bounds primitive from the screen shape wherein the bounds primitive bounds the screen shape;
rasterize the bounds primitive into a plurality of primitive pixels wherein each primitive pixel corresponds to a screen pixel;
decompose the screen shape into screen space primitives;
rasterize each screen space primitive into a plurality of mask pixels, wherein each mask pixel is divided into one or more pixel regions and each mask pixel corresponds to one of the primitive pixels;
classify each pixel region as a covered region or an uncovered region according to a coverage criterion;
classify each mask pixel as a covered mask pixel or uncovered mask pixel according to a secondary coverage criterion;
generate the coverage data based on the classifications according to the coverage criterion and the secondary coverage criterion;
combine the coverage data for each successive screen space primitive with the coverage data for the previous screen space primitives to produce the coverage data for the screen shape; and
screen the primitive pixels into retained pixels and discarded pixels,
the retained pixels each corresponding to one of the mask pixels that the coverage data indicates is a covered pixel, and
the discarded pixels each corresponding to one of the mask pixels that the coverage data indicates is an uncovered pixel.

20. An apparatus, comprising:
means for storing in a shape buffer coverage data for mask pixels;
means for converting a shape description into screen coordinates defining a screen shape;
means for generating a single bounds primitive from the screen shape wherein the bounds primitive bounds the screen shape;
means for rasterizing the bounds primitive into a plurality of primitive pixels wherein each primitive pixel corresponds to a screen pixel;
means for decomposing the screen shape into screen space primitives;
means for rasterizing each screen space primitive into a plurality of mask pixels, wherein each mask pixel is divided into one or more pixel regions and each mask pixel corresponds to one of the primitive pixels;
means for classifying each pixel region as a covered region or an uncovered region according to a coverage criterion;
means for classifying each mask pixel as a covered mask pixel or uncovered mask pixel according to a secondary coverage criterion;
means for generating the coverage data based on the classifications according to the coverage criterion and the secondary coverage criterion;
means for combining the coverage data for each successive screen space primitive with the coverage data for the previous screen space primitives to produce the coverage data for the screen shape; and
means for screening the primitive pixels into retained pixels and discarded pixels,
the retained pixels each corresponding to one of the mask pixels that the coverage data indicates is a covered pixel, and
the discarded pixels each corresponding to one of the mask pixels that the coverage data indicates is an uncovered pixel,
wherein at least one of the means for storing, means for converting, means for generating a bound primitive, means for rasterizing the bound primitive, means for decomposing, means for rasterizing each screen space primitive, means for classifying each pixel region, means for classifying each mask pixel, means for generating the coverage data, means for combining, and means for screening is implemented at least partially in hardware.

21. The apparatus of claim 20, further comprising:
means for generating pixel attributes for the retained primitive pixels and refraining from generating pixel attributes for the discarded primitive pixels.

22. The apparatus of claim 20, wherein the pixel attributes are generated by interpolating between attributes associated with vertices of the bounds primitive.

23. The apparatus of claim 20, further comprising:
means for generating one or more variables that indicate fractional coverage of the mask pixels, the fractional coverage being the portion of a mask pixel that is covered by the shape.

* * * * *